United States Patent
Macher et al.

[11] 4,196,970
[45] Apr. 8, 1980

[54] OPTICAL OBJECTIVE WITH EXTENDED VARIFOCAL RANGE

[75] Inventors: Karl Macher; Bernd-Edmund Masius, both of Bad Kreuznach; Werner Wagner, Odernheim, all of Fed. Rep. of Germany

[73] Assignee: Jos. Schneider & Co. Optische Werke, Bad Kreuznach, Fed. Rep. of Germany

[21] Appl. No.: 857,190

[22] Filed: Dec. 2, 1977

[30] Foreign Application Priority Data

Dec. 4, 1976 [DE] Fed. Rep. of Germany ....... 2655116

[51] Int. Cl.² .......................... G02B 15/18; G02B 7/10
[52] U.S. Cl. ..................................... 350/187; 350/184
[58] Field of Search ........................ 350/187, 184, 186

[56] References Cited

U.S. PATENT DOCUMENTS

| | | | |
|---|---|---|---|
| 3,773,402 | 11/1973 | Gela et al. | 350/184 |
| 4,078,857 | 3/1978 | Kantner et al. | 350/187 |
| 4,110,005 | 8/1978 | Bohm et al. | 350/187 |
| 4,113,355 | 9/1978 | Tsuji et al. | 350/184 |

Primary Examiner—Jon W. Henry
Attorney, Agent, or Firm—Karl F. Ross

[57] ABSTRACT

An objective of a photographic or cinematographic camera has an adjustable four-component front lens group and a fixed rear lens group. Axial displacement of the movable second and third components of the front group establishes a normal varifocal range in which the overall focal length varies between a minimum value $f_{min}$ and a maximum value $f_{max}$ having a ratio of 1:6. In the presence of a front attachment with a negatively refracting additional lens member, further shifting of the two movable components establishes an extended wide-angle range with focal lengths smaller than $f_{min}$; similarly, in the presence of a front attachment with a positively refracting additional lens member the two movable components are shiftable to establish an extended telephoto range with focal lengths greater than $f_{max}$. Between the normal and wide-angle ranges the third component is also shiftable, without attachment, to focus in a macro range.

8 Claims, 3 Drawing Figures

OPTICAL OBJECTIVE WITH EXTENDED VARIFOCAL RANGE

FIELD OF THE INVENTION

Our present invention relates to an optical objective with adjustable overall focal length, comprising a lens assembly with two axially shiftable components which can be concurrently but independently displaced by manual or automatic control means between a lower and an upper limit of a varifocal range.

BACKGROUND OF THE INVENTION

Conventional varifocal objectives of this type can be fitted with various attachments to extend their ratio of maximum and minimum overall focal lengths, either beyond the wide-angle end or beyond the telephoto end of their normal operating range. Such an extension of the normal range can also be effected by an exchange or an interposition of lens members, e.g. with the aid of a revolving carrier or turret. These attachments are, generally, somewhat unhandy, especially when it is desired to shift the operating range toward the shorter focal lengths since the resulting increase in the object-side field angle requires lenses of larger diameter at the front of the objective. Thus, a conventional wide-angle attachment includes a large negative front lens followed by several lenses or lens combinations air-spaced therefrom. The effect of such an attachment is to multiply the numerical values of the overall focal length in the various positions of the shiftable components by a factor smaller than unity, with the law of relative displacement of these components remaining unchanged; on the telephoto side the multiplication factor has a value greater than unity.

OBJECT OF THE INVENTION

The object of our present invention is to provide simple, inexpensive and easily manipulable means for extending the normal operating range of such a varifocal objective beyond its wide-angle and/or its telephoto limit.

SUMMARY OF THE INVENTION

We realize this object, pursuant to our present invention, by the provision of supplemental lens means positionable in front of the varifocal lens assembly whenever that assembly arrives at a limit of its normal range, the associated control means being operable to establish an adjoining ancillary range by axially displacing both shiftable components of the assembly in the presence of the supplemental lens means to increase the ratio of maximum and minimum overal focal lengths while maintaining the same fixed image plane throughout the normal range and the ancillary range or ranges.

Generally, the normal operating range will be separated from each ancillary range, established in accordance with our invention, by an intervening range in which the image plane is not stationary and which is of no further interest as far as the range extension is concerned, except at the wide-angle end where that intervening range may be used to focus the lens assembly upon nearby objects in a so-called macro range.

Advantageously, the camming sleeve serving for the axial displacement of the two shiftable components of our improved lens assembly has guide tracks (e.g. grooves) of which the first one—controlling the movement of the object-side shiftable component—has a constant slope within the normal operating range, as is usual in varifocal objectives. In the ancillary range or ranges according to our invention, the same guide track preferably also has a constant slope which, however, is different from its slope in the normal range and may in fact be of opposite sign. The law of motion of the image-side shiftable component, serving to maintain the constancy of the image plane, is therefore also different in the several ranges.

BRIEF DESCRIPTION OF THE DRAWING

The above and other features of our invention will now be described in detail with reference to the accompanying drawing in which.

SPECIFIC DESCRIPTION

Figure 3:
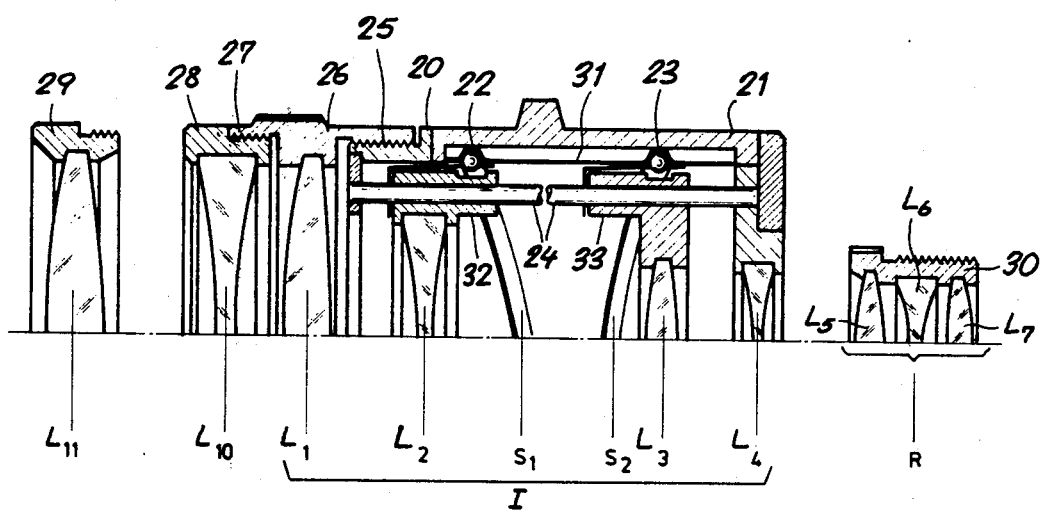
FIG. 3 is an axial sectional view of the upper half of an objective conforming to the diagram of FIG. 1.

Reference will first be made to FIG. 3 in which we have shown a largely conventional objective of a photographic or cinematographic camera with a lens assembly including a varifocal front group I and a fixed-focus rear group or relay component R. Front group I consists of four components here shown for the sake of simplicity as single lenses $L_1$, $L_2$, $L_3$ and $L_4$. This lens group is of the general type described in commonly owned U.S. Pat. No. 3,451,743, with two axially shiftable components $L_2$ and $L_3$ of negative and positive refractivity, respectively; the first or front component $L_1$ is of positive refractivity whereas the fourth component $L_4$ is negatively refracting.

Front group I is mounted in a camera housing 20 centered on the optical axis of the objective, a sleeve 21 being rotatable about that axis to displace the second and third components $L_2$, $L_3$ whose lens mounts 32 and 33 carry balls 22 and 23 engaging in camming grooves $S_1$, $S_2$ of a cylindrical sheet 31 secured to that sleeve. Lens mounts 32 and 33 are slidably guided on axially extending rods 24 (only one shown); see commonly owned U.S. Pat. No. 3,931,629 for further details. A ring 26 threadedly engages the housing 20 at 25 and holds the front lens $L_1$ which is thus limitedly axially shiftable for focusing the objective in the normal varifocal range. Rear group R, consisting of a positive lens $L_5$, a negative lens $L_6$ and another positive lens $L_7$, is seated in a lens mount 30 rigid with housing 20.

Figure 1:
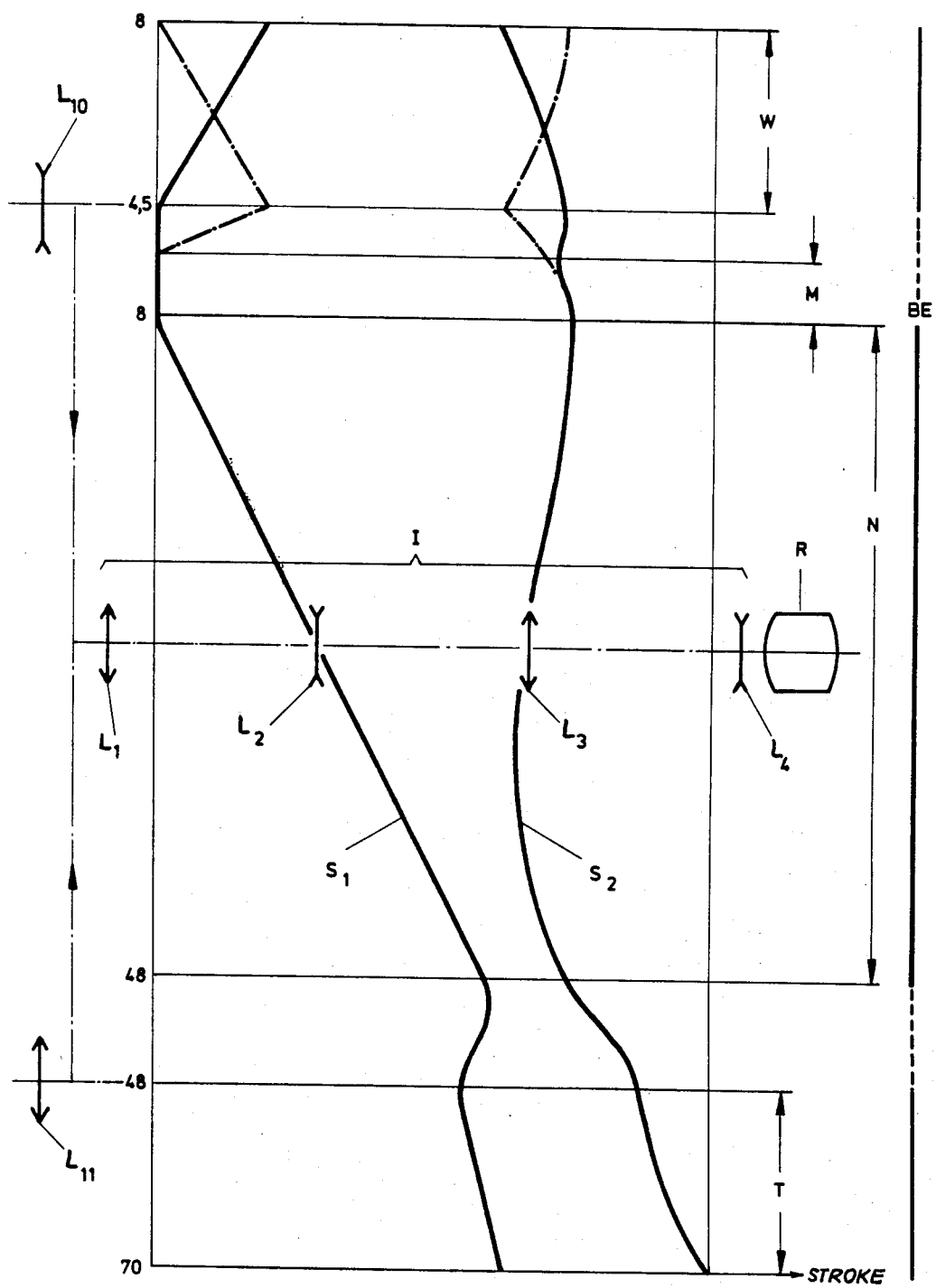
FIG. 1 is a developed view of the guide tracks of two axially shiftable components of a varifocal objective according to our invention.

Focusing ring 26 has a flange 27 threadedly accommodating either of two attachments 28, 29 which carry supplemental lenses $L_{10}$ and $L_{11}$ of negative and positive refractivity, respectively. These attachments are alternatively emplaceable on ring 26, in line with lens assembly $L_1$–$L_7$, when the shiftable components $L_2$ and $L_3$ of group I have arrived at a respective end of a normal operating range N as shown in FIG. 1. In the embodiment represented there, the overall focal length F of the objective changes from a minimum value of 8 mm at the wide-angle end of range N to a maximum value of 48 mm at the telephoto end of that range, thus providing a varifocal ratio $F_{max}:F_{min}=6:1$.

An image plane BE remains constant throughout range N. At the wide-angle end of F=8 mm, however, component $L_3$ may be further displaced while component $L_2$ remains stationary to bring about a sharp reduction in the overall focal length concurrently with a shifting of the image plane whereby the objective is focusable upon nearby objects as is well known per se. This so-called macro range has been designated M and is characterized by a shift of component $L_3$ toward the left, i.e. to the object side of the system; in principle, macro focusing is also possible by a shift of component $L_2$ while holding component $L_3$ stationary.

The guide track $S_2$ of component $L_3$ is so shaped that component $L_3$, upon further rotation of the control sleeve 21 of FIG. 3, is shifted partly back to the right after reaching the extreme macro position. At this point, which represents one of the boundaries of an adjoining wide-angle range W, the negative supplemental lens $L_{10}$ is placed in front of component $L_1$ to realign the image plane BE with the position it had in the normal range N. Lens $L_{10}$ may have a power of about $-10$ to $-20$ diopters corresponding to an individual focal length of $-50$ to $-100$ mm.

It will be understood that the addition of this negative supplemental lens $L_{10}$ results in a slight increase of the overall focal length from the low value, substantially less than 8 mm, it assumed on account of the forward shift of component $L_3$. The new focal length at the end of the extended wide-angle range W is 4.5 mm and represents the lowest value attainable with this system for focusing upon infinity. Further rotation of camming sleeve 21 moves the two lenses $L_2$ and $L_3$ toward each other to increase the focal length until it again reaches the value $F=8$ mm it had at the wide-angle end of the normal varifocal range N.

At the opposite end of that varifocal range, i.e. in a position of $F=48$ mm, further rotation of the camming sleeve separates the two shiftable lenses $L_2$ and $L_3$ within an intervening range of instability of image plane BE (the progressively increasing overall focal length) until they reach a position where the addition of the positively refracting supplemental lens $L_{11}$ re-establishes the value of $F=48$ mm while restoring the image plane to its normal position. From that point on the tracks $S_1$, $S_2$ again diverge, letting the lenses $L_2$ and $L_3$ separate in an extended telephoto range T whose other boundary represents an overall focal length $F=70$ mm.

Thus, the overall focal length F is continuously variable from a lowest value of 4.5 mm to a highest value of 70 mm which corresponds to an extended varifocal ratio of about 15.5:1.

Lens $L_{11}$ may have a power of about 0.5 to 5 diopters corresponding to an individual focal length of 200 to 2,000 mm. The maximum stroke of lens $L_2$ is about 65 mm, that of lens $L_3$ being about 37 mm.

Naturally, the bulge in track $S_2$ establishing an extreme macro position can be omitted if focusing in the macro range is not required. It is evidently also possible to displace the lenses $L_2$ and $L_3$ from the extreme macro position directly into the position shown at the top of FIG. 1 in which $F=8$ mm in the presence of lens $L_{10}$, the additional range from 8 mm to 4.5 mm being then traversed upon further rotation of sleeve 21 as indicated in dot-dash lines.

Figure 2:
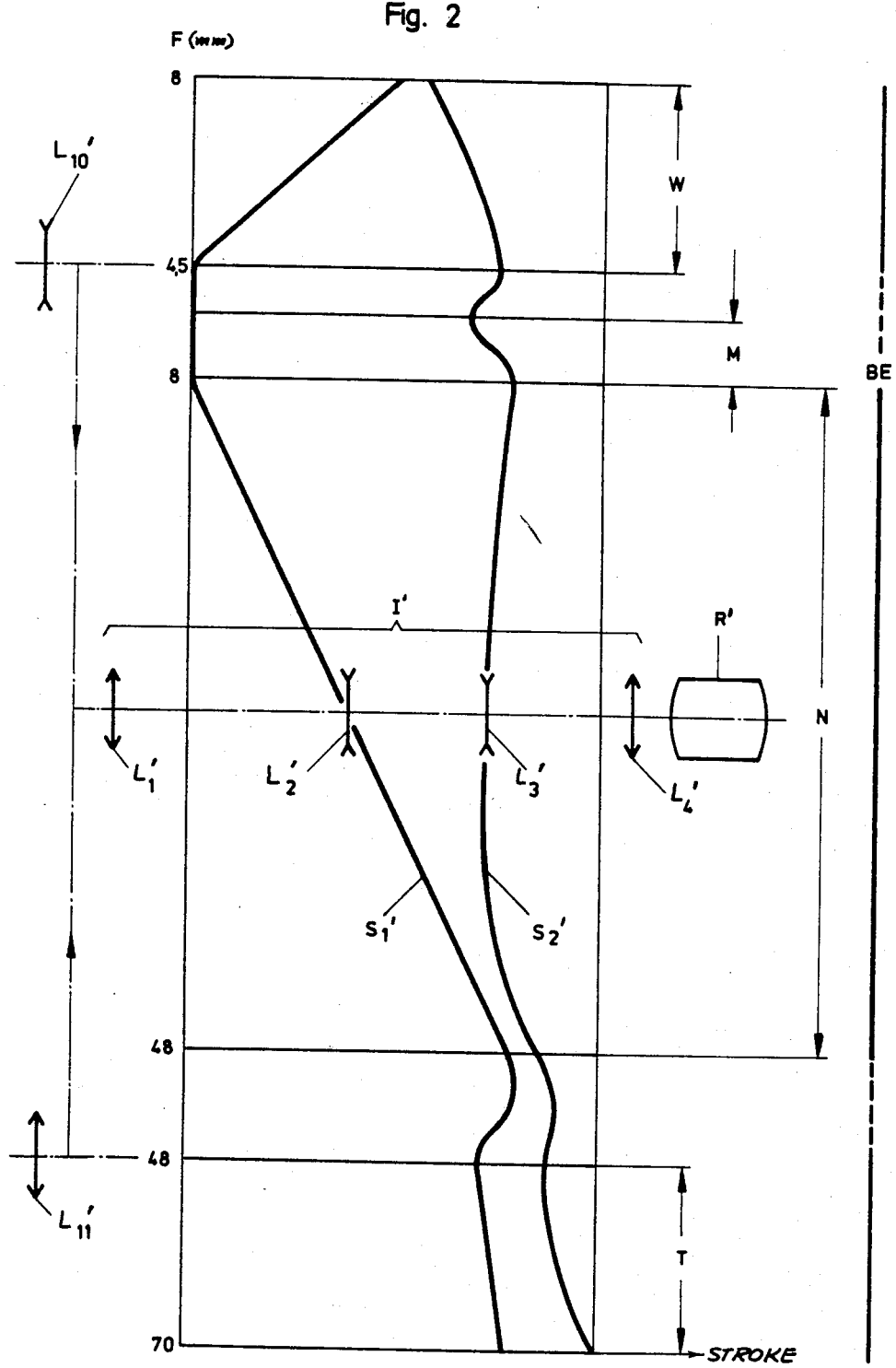
FIG. 2 is a diagram similar to that of FIG. 1, illustrating a modification.

FIG. 2 shows a modified objective with components $L_1'$, $L_2'$, $L_3'$, $L_4'$, $R'$ and supplemental lenses $L_{10}'$, $L_{11}'$. In this system the two shiftable components $L_2'$, $L_3'$ of the varifocal group I' are both negative while the stationary (or substantially stationary) components $L_1'$ and $L_4'$ are positive, e.g. as shown in commonly owned U.S. Pat. No. 3,273,457, 3,442,573 or 3,457,003. Guide tracks $S_1'$ and $S_2'$ are shaped generally similarly to tracks $S_1$ and $S_2$ of FIG. 1. The maximum strokes of components $L_2'$ and $L_3'$ are about 60 and 32 mm, respectively. Again, an extreme macro position beyond the wide-angle end of the normal range N could be skipped, with or without inversion of the extended range W as described above.

The displacement of the shiftable components in the manner illustrated in FIGS. 1 and 2 could also be brought about automatically with digital control, e.g. as described in commonly owned U.S. Pat. No. 4,008,951. The law of displacement may be prerecorded on a data carrier such as a glass rod or a perforated tape. With manual control, the various operating ranges N, W and T could be indicated to the user by distinctive coloring, for example; a control member such as sleeve 21 could be indexable at the boundaries of these several ranges, e.g. by means of a ball check, to alert the user to the need for emplacing or removing a supplemental lens.

The supplemental lenses $L_{10}$, $L_{11}$ or $L_{10}'$, $L_{11}'$ may be given an aspherical curvature for improved optical performance.

Whereas focusing upon objects at distances closer than infinity is accomplished in the normal range N by the axial displacement of front lens $L_1$ or $L_1'$, such focusing can be carried out in the two extended ranges W and T by a shifting of either or both components $L_2$, $L_3$ or $L_2'$, $L_3'$ in a manner moving the image plane BE out of its normal position.

We claim:

1. In an optical objective of adjustable overall focal length, with a lens assembly including two axially shiftable components and control means coupled with said shiftable components for concurrently displacing same to vary said overall focal length between a lower value and an upper value defining a wide-angle end and a telephoto end of a normal varifocal range, the combination therewith of supplemental lens means positionable in front of said lens assembly upon arrival at a limit of said normal range, said control means being operable to establish an adjoining ancillary range by axially displacing both said shiftable components in the presence of said supplemental lens means to increase the ratio of maximum and minimum overall focal lengths beyond the ratio of said upper and lower values, with maintenance of a fixed image plane throughout both said normal range and said ancillary range;

said supplemental lens means including negative lens means and positive lens means alternatively positionable in front of said lens assembly at said wide-angle end and at said telephoto end, respectively, said shiftable components being concurrently displaceable by said control means to establish an ancillary wide-angle range in the presence of said negative lens means and an ancillary telephoto range in the presence of said positive lens means.

2. The combination defined in claim 1 wherein at least one of said shiftable components is displaceable by said control means in a zone between said normal range and said wide range ancillary range to focus said lens assembly upon objects in a macro range.

3. The combination defined in claim 1 wherein said lens assembly includes a variable four-component front group and a fixed rear group, said shiftable components being a second and a third component of said front group.

4. The combination defined in claim 3 wherein said front group includes a first component shiftable independently of said second and third components, further comprising focusing means coupled with said first component for displacing same.

5. The combination defined in claim 3 wherein said control means comprises a camming sleeve with guide tracks for said second and third components, the guide track for said second component having a constant slope in said normal range and a different constant slope in said ancillary telephoto range.

6. The combination defined in claim 5 wherein the guide track for said second component has slopes of opposite sign in said normal and ancillary wide-angle ranges and has infinite slope in an intervening range.

7. In an optical objective of adjustable overall focal length, comprising a lens assembly which includes a fixed rear group and a variable four-component front group with axially shiftable second and third components, said assembly being provided with control means coupled with said shiftable components for concurrently displacing same to vary said overall focal length between a lower value and an upper value defining a wide-angle end and a telephoto end of a normal varifocal range, the combination therewith of supplemental lens means positionable in front of said lens assembly upon arrival at a limit of said normal range, said control means being operable to establish an adjoining ancillary range by axially displacing both said shiftable components in the presence of said supplemental lens means to increase the ratio of maximum and minimum overall focal lengths beyond the ratio of said upper and lower values, with maintenance of a fixed image plane throughout both said normal range and said ancillary range;

said control means comprising a camming sleeve with guide tracks for said second and third components, the guide track for said second component having constant slopes of the same sign but different magnitudes in said normal and ancillary ranges and having a slope of opposite sign in an intervening range.

8. The combination defined in claim 7 wherein said ancillary range is separated by said intervening range from the telephoto end of said normal range.

* * * * *